United States Patent [19]
Mollere

[11] 3,968,855

[45] July 13, 1976

[54] SEISMIC MARINE GUN ASSEMBLY

[75] Inventor: John C. Mollere, Nassay Bay, Tex.

[73] Assignee: Hercules Incorporated, Wilmington, Del.

[22] Filed: Jan. 13, 1975

[21] Appl. No.: 540,363

Related U.S. Application Data

[63] Continuation-in-part of Ser. No. 115,361, Feb. 16, 1971, abandoned, and a continuation of Ser. No. 354,270, April 25, 1973, abandoned.

[52] U.S. Cl. ................................ 181/118; 181/116; 181/114; 340/7 R; 102/22
[51] Int. Cl.² ...................... G01V 1/38; F42D 3/06
[58] Field of Search ................... 181/118, 116, 114; 102/22; 340/7

[56] References Cited
UNITED STATES PATENTS

| | | | |
|---|---|---|---|
| 3,211,475 | 10/1965 | Freed et al. | 285/236 |
| 3,578,101 | 5/1971 | Larson | 181/116 |
| 3,601,052 | 8/1971 | Mollere | 102/22 |

*Primary Examiner*—Nelson Moskowitz
*Attorney, Agent, or Firm*—Michael P. Breston

[57] ABSTRACT

The underwater gun assembly of this invention has an acceleration barrel and a firing gun. Percussion-initiatable cartridges are carried to the acceleration barrel by a stream of water. Each cartridge has an outside diameter which is nearly equal to the inside diameter of the bore in the barrel whose length is such as to allow the water pressure to optimally accelerate each cartridge in its trajectory through the barrel. The firing gun is detachably coupled to the barrel by a quick-disconnect coupling means. The detachable coupling means preferably includes a non-metallic resilient member which absorbs the shock waves from the ambient charge explosions, thereby preserving the integrity of the coupling means in respect of its detachable characteristics.

6 Claims, 5 Drawing Figures

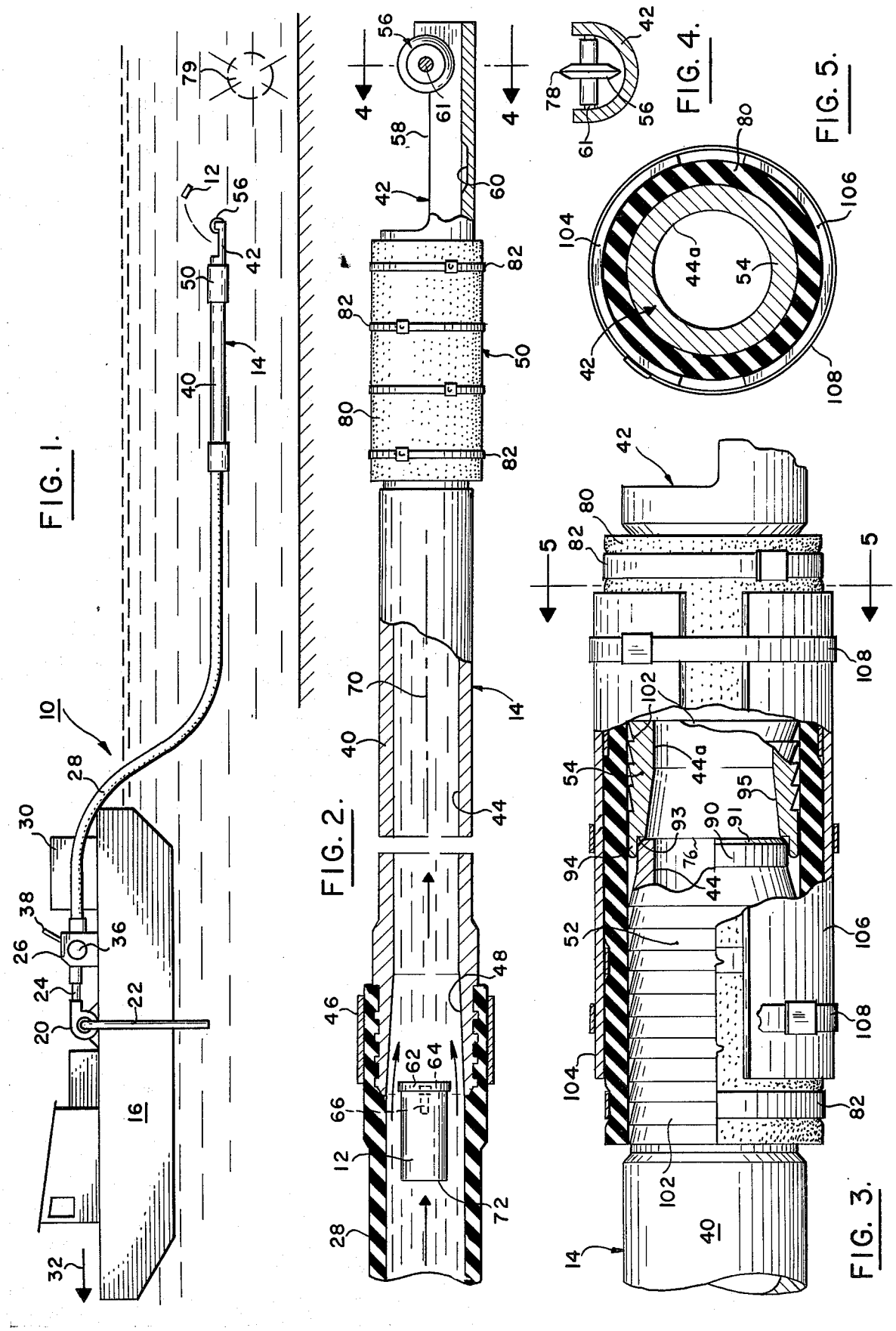

SEISMIC MARINE GUN ASSEMBLY

REFERENCE TO RELATED APPLICATIONS

This application is a continuation-in-part of my copending application Ser. No. 115,361, filed Feb. 16, 1971 and now abandoned, and also a continuation of application Ser. No. 354,270 filed Apr. 25, 1973, now abandoned.

BACKGROUND OF THE INVENTION

This invention relates generally to marine seismic energy sources and particularly to an improved underwater gun assembly for launching into a body of water and percussion-initiating cartridges containing explosive charges.

In patent application, Ser. No. 115,367, filed Feb. 16, 1971 and now abandoned, of which I am a co-inventor there is described a charge loader for consecutively inserting each cartridge into the stream of water flowing through the gun assembly of this invention.

DESCRIPTION OF THE PRIOR ART

Seismic marine exploration systems are known which employ a towed underwater gun for launching into the water relatively small cartridges containing explosive charges which are then detonated. One such system is described in U.S. Pat. No. 3,496,532. In U.S. Pat. No. 3,509,820 are described explosively-operated cartridges which are usable with such known underwater guns, as well as with the underwater gun assembly of this invention.

Also, in my U.S. Pat. No. 3,601,052 is described an underwater gun having a casing with a lateral ejection window. At the end of the casing is positioned a percussion element for initiating each arriving cartridge and expelling it through the window into the body of water. While operating satisfactorily most of the time, the known gun was found to be occasionally deficient in at least two respects. Firstly, the cartridges would not hit the percussion element with sufficient force, and, secondly, the firing pins of some cartridges would miss the percussion element because of poor alignment between the pins and the percussion element. Another serious shortcoming of the known gun was that, upon becoming damaged from the explosions or use, the entire gun had to be discarded at considerable economic loss.

SUMMARY OF THE INVENTION

This invention provides a new and improved underwater gun assembly which assures that each cartridge is first accelerated in a separate barrel-type accelerator-and-aligner. Then the cartridge is percussion initiated by the firing gun which is detachably, and preferably resiliently, coupled to the acceleration barrel. By assuring a consistently correct alignment of the firing in in each cartridge with the percussion element, damage to the gun assembly is practically eliminated.

The invention is accelerator on the recognition of the need to assure that each cartridge will be accelerated to such an extent that its kinetic energy, at the time it reaches the firing gun itself, is great enough to ensure that the firing pin in the charge will be percussion-initiated and ignition will actually occur. The accelurator provides sufficient kinetic energy content and accurately aligns the path of each cartridge with a path of well-defined orientation, so that its firing pin will consistently strike the percussion-initiating element in the gun. The combination of these two aspects of the gun assembly of the invention will assure that the cartridge will hit the percussion-initiating element of the gun with both sufficient energy and accurate alignment, to thereby eliminate the shortcomings of the known gun, wherein not every cartridge reached the gun in proper alignment and with sufficient kinetic energy to produce the impact required to trigger the ignition of the explosive charge in the cartridge.

In a preferred embodiment of the invention, the accelerator of the gun assembly is mounted ahead of the gun itself and forms a tubular channel for a cartridge. The diameter of the channel is made only slightly larger than that of the cartridge to cause the cartridge to be propelled therein like a piston in a cylinder.

The accelerator is removably secured at its leading end to the gun, and at its trailing end to the water-carrying conduit. The conduit has preferably an internal diameter exceeding that of the barrel portion of the channel in the accelerator. The channel has a tapered forward portion to provide a smooth transition between the conduit and the channel.

Preferably, the detachable means coupling the gun to the accelerator include a resilient member which absorbs the created shocks of explosion and yet allows the use of relatively-inexpensive, quick connct-and-disconnect means for detachably securing the gun to the accelerator.

BRIEF DESCRIPTION OF THE DRAWINGS

FIG. 1 schematically illustrates the gun assembly of this invention, as it is towed by a seismic vessel equipped to launch cartridges containing explosive charges;

FIG. 2 is a view partly in section of the gun assembly of FIG. 1, illustrating a water-propelled cartridge as it enters into the accelerator;

FIG. 3 is a sectional view illustrating the coupling assembly for detachably securing the gun to the accelerator;

FIG. 4 is a cross-sectional view taken along line 4—4 on FIG. 2, illustrating the gun's wheel-shaped percussion element; and FIG. 5 is a cross-sectional view taken along line 5—5 on FIG. 3.

Referring to the drawings, and in particular to FIG. 1, there is shown an explosion-producing marine seismic system, known as the MAXIPULSE system and generally designated as 10. System 10 is mounted upon a vessel 16. Although system 10 does not form part of this invention, it is believed necessary to briefly describe it for a better comprehension of the improved gun assembly of the present invention.

System 10 is designed to consecutively deliver explosively-operated cartridges 12 to the gun assembly 14 of this invention. Each cartridge 12 includes a delay fuse which causes the initiated charge therein to detonate a short time later, at a desired distance away from gun assembly 14 which moves in the direction of the arrow 32, typically at a speed between five to ten knots. Gun assembly 14 is towed by the seismic vessel 16 on whose deck 18 is positioned a water pump 20 having an intake line 22 and an outlet line 24. Outlet line 24 feeds water under pressure to a cartridge loader 26 which is coupled to gun assembly 14 through a conduit, generally a flexible hose 28. A storage compartment 30 stores the explosive-containing cartridges 12.

Loader 26 has a rotatably-mounted plug 36 which can be rotated by a handle 38. Plug 36 has a transverse bore into which a cartridge 12 can be inserted when the plug is in one rotational position. When the plug is rotated into another position, the bore with the cartridge therein is then brought into the water steam 34 (FIG. 2) flowing from loader 26 through hose 28.

With particular reference now to FIGS. 2 through 4, gun assembly 14 generally comprises a barrel-type accelerator-and-aligner 40 and a firing gun 42, both preferably made of heavy-gauge steel. Accelerator 40 has nearly throughout its entire length a cylindrical bore 44 constituting the tubular channel and having a diameter only slightly larger than the outside diameter of a cartridge 12. The clearance between a cartridge and the internal wall of bore 44 is made just sufficient to permit the cartridge to pass through bore 44. Therefore, practically no water will be able to bypass the cartridge in its trajectory through bore 44, and for a given length of bore 44, a maximum acceleration effect will be achieved. Hose 28 is securely fastened to barrel 40 by a clamp 46 which provides a watertight connection.

To facilitate the passage of each cartridge 12 through hose 28, the inner diameter of the hose is made larger than the outside diameter of a cartridge. Suitably, there is provided a tapered portion 48 at the entrance to bore 44 to allow for a smooth transition between the larger diameter of hose 28 and the smaller diameter of bore 44.

The length of bore 44 is selected to allow each charge 12 to attain a sufficient content of kinetic energy when passing through accelerator 40. The length of bore 40 is selected as a multiple of the length of a cartridge. Optimum results are obtained when accelerator 40 has a length ranging from 4 to 7 feet, with the conventional cartridges having a length of several inches.

Firing gun 42 is provided with a rotatably mounted percussion wheel 56 and with a lateral ejection window 58. Wheel 56 is rotatably mounted on a fixed shaft 61. A recessed area 60 in the casing forming the firing gun facilitates the outward ejection of cartridge 12. A conventional cartridge 12 has an end surface 62 from which a recessed well 64 extends inwardly into the cartridge 12, the well containing a primer assembly 66. A detailed description of the firing gun itself is provided in my above-mentioned U.S. Pat. No. 3,601,052. In this patent, the gun is directly coupled to the water hose.

In operation of the gun assembly 14 of this invention, cartridge 12, as it moves downwardly through hose 28, is free to wobble, i.e. to randomly and continuously change its orientation relative to the longitudinal axis. As the cartridge enters the tapered portion 48 (FIG. 2), its longitudinal axis becomes aligned with the longitudinal axis 70 of accelerator 40. From this point, the rear end 72 of the cartridge will be propelled like a piston inside and through bore 44.

The kinetic energy of cartridge 12 progressively increases as it passes through bore 44. Upon reaching the interface 76 between accelerator-and-aligner 40 and firing gun 42, cartridge 12 attains a sufficient kinetic energy content and is in true alignment with the longitudinal axis 70 of accelerator 40, which is also the longitudinal axis of the firing gun 42. Wheel 56 has a circular edge 78 of V-shaped cross-section whose plane includes the longitudinal axis 70. Consequently, the primer assembly 66 will always accurately strike edge 78, and the possibility of it missing edge 78 is nearly completely eliminated which is a very important aspect of this invention.

Immediately after thus being percussion-initiated by the firing wheel 56, cartridge 12 becomes ejected through the lateral window 58 into the body of water, as shown in FIG. 1. At a safe distance (say 7 to 10 feet) from gun assembly 14, the charge in cartridge 12 explodes to create a seismic explosion schematically illustrated at location 79. Should an accident occur and the firing gun become damaged, or when the firing head is in need of repair, it can be easily removed and replaced through the quick removable coupling means 50. Since accelerator 40 is considerably more expensive to manufacture than the firing gun 42, the economic loss has thus been considerably reduced by the invention.

Accelerator 40 is coupled to the firing gun 42 by a detachable coupling assembly 50 which serves to align their respective serrated end portions 52 and 54, as shown in FIG. 3. More specifically, the outer end 90 of end portion 52 is of a lesser diameter than that of the serrated portion and is adapted to snugly engage inside the cylindrical outer end 94 of end portion 54. The end 90 is chamfered as at 91 and abuts against a shoulder 93 formed by cylindrical portion 94. The inner periphery of shoulder 93 is of slightly greater diameter than the inner diameter of bore 44. The wall portion 95 of end 54 tapers inwardly downstream of the shoulder 93. Since the accelerator's bore 44 is of the same diameter as that of bore 44A in the firing gun 42, it will be appreciated that the above described arrangement will allow the moving cartridge to pass smoothly through the tight joint.

A coupling sleeve member 80 constructed of a nonmetallic, resilient material encases the abutting end portions 52 and 54. The inner wall of the sleeve engages the circumferential serrations 102 on end portions 52 and 54, respectively. Around sleeve 80 are provided on the opposite sides of the joint, a plurality of circumferentially-positioned metallic locking bands 82. The bands are preferably of the type known as "punch-lok" bands and their ends are fastened together by "punch-lok" clamps. These clamps can be easily removed with an ordinary screwdriver.

The resilient sleeve 80 absorbs the shock waves resulting from the ambient explosions and thereby allows the bands 82 to continuously maintain their clamping effect around the serrations 102.

If desired to provide a stiffer connection, two metallic, semi-cylindrical, splint members 104 and 106 can be fitted around the joint and secured thereto by bands 108, as shown.

The use of the metallic bands is inexpensive, fast and constitutes an important advantage of this invention as compared to a clamp arrangement utilizing bolts which either come off or "freeze" under the influence of the shock waves.

What is claimed is:

1. An underwater gun assembly for marine seismic exploration, into which, during operation, explosive-charged cylindrical cartridges are propelled by water under pressure flowing through a flexible conduit coupled to the gun assembly, comprising in combination:
  A. a cylindrical firing gun having near its end a percussion element;
  B. a barrel consisting of a cylindrical section and of a conical section, said conical section being forwardly of and tapering inwardly toward said cylindrical section, and said cylindrical section having a bore whose diameter is only slightly larger than the outer diameter of a cartridge and whose length is a multiple of the length of said cartridge, whereby said bore provides a sufficiently-long, alignment-and-acceleration passage for said cartridge to align the cartridge's longitudinal axis with the longitudinal axis of said cylindrical section, and to propel the cartridge into the firing gun with a predetermined acceleration for the proper initiation of said cartridge by said firing gun; and C. coupling means detachably coupling the cylindrical section of said barrel forwardly of and in abutting coaxial engagement with said cylindrical firing gun.

2. The underwater gun assembly of claim 1 wherein said coupling means include:

a resilient sleeve encasing the abutting cylindrical end portions of said barrel and of said gun, the resiliency of said sleeve absorbing a portion of the energy of explosion contained in said cartridge; and clamping means around said sleeve securely coupling said barrel to said gun.

3. The gun assembly to claim 2 wherein said clamping means include a plurality of circumferential, metallic bands longitudinally spaced-apart from each other.

4. The gun assembly of claim 1 wherein said coupling assembly comprises:

a cylindrical, resilient sleeve adapted to encase the abutting end portions of said barrel and of said gun, and a plurality of metallic bands circumferentially positioned around said sleeve in longitudinal spaced-apart relation from each other.

5. The system of claim 4 wherein said bands have clamp means for securing the ends of said bands together.

6. The system of claim 4 wherein said coupling assembly further includes:

at least two metallic, splint members fitted around said sleeve, and a plurality of metallic bands circumferentially positioned in spaced-apart relation around said splint members.

* * * * *